(12) United States Patent
Allam

(10) Patent No.: US 9,169,778 B2
(45) Date of Patent: *Oct. 27, 2015

(54) GENERATING POWER FROM NATURAL GAS WITH CARBON DIOXIDE CAPTURE

(71) Applicant: GTLpetrol LLC, New York, NY (US)

(72) Inventor: Rodney J. Allam, Wiltshire (GB)

(73) Assignee: GTLpetrol LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/294,843

(22) Filed: Jun. 3, 2014

(65) Prior Publication Data

US 2014/0283526 A1    Sep. 25, 2014

Related U.S. Application Data

(63) Continuation of application No. 12/763,081, filed on Apr. 19, 2010, now Pat. No. 8,769,961.

(60) Provisional application No. 61/170,475, filed on Apr. 17, 2009.

(51) Int. Cl.
*F02C 3/20* (2006.01)
*F02C 6/18* (2006.01)
*C01B 3/36* (2006.01)
*C01B 3/38* (2006.01)
*C01B 3/48* (2006.01)

(52) U.S. Cl.
CPC ... *F02C 6/18* (2013.01); *C01B 3/36* (2013.01); *C01B 3/382* (2013.01); *C01B 3/384* (2013.01); *C01B 3/48* (2013.01); *C01B 2203/025* (2013.01); *C01B 2203/0233* (2013.01); *C01B 2203/0283* (2013.01); *C01B 2203/0844* (2013.01); *C01B 2203/1235* (2013.01); *C01B 2203/1294* (2013.01); *C01B 2203/141* (2013.01); *C01B 2203/82* (2013.01); *C01B 2203/84* (2013.01); *C01B 2203/86* (2013.01); *Y02E 20/14* (2013.01)

(58) Field of Classification Search
CPC .................. C01B 2203/0233; C01B 2203/025; C01B 2203/0283; C01B 2203/0288; C01B 2203/0844; C01B 2203/1235; C01B 2203/1294; C01B 2203/141; C01B 2203/82; C01B 2203/84; C01B 2203/86; C01B 3/36; C01B 3/382; C01B 3/384; C01B 3/48; Y02E 20/14
USPC ............................... 60/780, 781, 39.5, 39.511
See application file for complete search history.

(56) References Cited

U.S. PATENT DOCUMENTS

| 3,765,167 | A | 10/1973 | Rudolph et al. |
| 4,132,065 | A | 1/1979 | McGann |

(Continued)

FOREIGN PATENT DOCUMENTS

WO    WO 2009/155554    12/2009

*Primary Examiner* — Gerald L Sung
(74) *Attorney, Agent, or Firm* — Fish & Richardson P.C.

(57) ABSTRACT

A hydrogen rich fuel gas for a gas turbine ballasted with nitrogen and steam can be produced and superheated to a temperature above its dew point. The fuel gas may have a minimal or reduced content of $CO_2$ or fuel components CO and $CH_4$ which contain carbon so that when combusted in a suitable gas turbine there may be minimal or reduced emissions of $CO_2$ to the atmosphere. These example methods may result in a capture of the bulk of the carbon present in the total natural gas feed as $CO_2$ compressed to pipeline delivery pressure for sequestration.

26 Claims, 9 Drawing Sheets

(56) References Cited

U.S. PATENT DOCUMENTS

| | | |
|---|---|---|
| 4,741,885 A | 5/1988 | Herbort et al. |
| 5,388,395 A | 2/1995 | Scharpf et al. |
| 6,534,551 B2 | 3/2003 | Allam et al. |
| 6,669,744 B2 | 12/2003 | Allam et al. |
| 6,809,121 B1 | 10/2004 | Rytter et al. |
| 7,451,618 B2 | 11/2008 | Ansorge et al. |
| 7,503,947 B2 | 3/2009 | Barnicki |
| 7,632,476 B2 | 12/2009 | Shah et al. |
| 8,394,154 B2 | 3/2013 | You et al. |
| 2002/0098132 A1 | 7/2002 | Vidalin |
| 2003/0119919 A1 | 6/2003 | Allam et al. |
| 2004/0216465 A1 | 11/2004 | Sheppard et al. |
| 2005/0032920 A1* | 2/2005 | Norbeck et al. ............... 518/704 |
| 2006/0074132 A1 | 4/2006 | Allam et al. |
| 2007/0130957 A1 | 6/2007 | Hoffmann et al. |
| 2007/0227069 A1 | 10/2007 | Norbeck et al. |
| 2008/0028765 A1* | 2/2008 | Bartlett ............................ 60/780 |
| 2008/0041829 A1 | 2/2008 | Blutke et al. |
| 2008/0155984 A1 | 7/2008 | Liu et al. |
| 2009/0117024 A1 | 5/2009 | Weedon et al. |
| 2009/0211442 A1 | 8/2009 | Allam |
| 2010/0022668 A1 | 1/2010 | Allam |
| 2010/0047160 A1 | 2/2010 | Allam |

* cited by examiner

| lBMOL/HR | 1 | 4, 31 | 5 | 9 | 12 | 17 | 16 | 19 |
|---|---|---|---|---|---|---|---|---|
| CO | 2895.00 | 0 | 0 | 1599.5 | 280.3 | 0 | 280.3 | 280.3 |
| $H_4$ | 12151.2 | 0 | 0 | 15366.00 | 16684.7 | 0 | 16684.7 | 16684.7 |
| $CO_2$ | 933.9 | 0 | 29.8 | 4150.2 | 5469.4 | 0 | 3 | 3 |
| $H_2O$ | 8984.3 | 0 | 0 | 5770.00 | 4450.8 | 0 | 100 | 100 |
| $CH_4$ | 326.1 | 0 | 3976.00 | 326.1 | 326.1 | 0 | 326.1 | 326.1 |
| $O_2$ | 0 | 2782.9 | 0 | 0 | 0 | 177.5 | 177.5 | 177.5 |
| $N_2$+Ar | 47.7 | 14.00 | 24.4 | 47.7 | 47.7 | 22009.7 | 22009.7 | 22009.7 |
| $C_2$ | 0 | 0 | 132.7 | 0 | 0 | 0 | 0 | 0 |
| $C_3$ | 0 | 0 | 22.7 | 0 | 0 | 0 | 0 | 0 |
| $C_4$ | 0 | 0 | 4.2 | 0 | 0 | 0 | 0 | 0 |
| $C_5$ | 0 | 0 | 0.9 | 0 | 0 | 0 | 0 | 0 |
| $C_6$ | 0 | 0 | 1.7 | 0 | 0 | 0 | 0 | 0 |
| TOTAL lBMOL/HR | 27259.00 | 2796.9 | 4194.2 | 27259.00 | 27259.00 | 22187.2 | 39581.3 | 39581.3 |
| TEMPERATURE °C | 320 | 270 | 500 | 305.5 | 253.2 | 65 | 50 | 187 |
| PRESSURE BAR | 78 | 80 | 80 | 34 | 33.5 | 33 | 33 | 32.5 |

FIG. 2

| IBMOL/HR | 47 | 25 | 30 | 28 | 35 | 36 | 39 | 41 |
|---|---|---|---|---|---|---|---|---|
| CO | 0 | 0 | 0 | 0 | 0 | 0 | 0 | 0 |
| $H_4$ | 0 | 0 | 0 | 0 | 0 | 0 | 0 | 0 |
| $CO_2$ | 5.8 | 412 | 0 | 0 | 114 | 0 | 0 | 6124.4 |
| $H_2O$ | 0 | 0 | 500 | 10021.7 | 10021.7 | 2335.4 | 6110.12 | 0 |
| $CH_4$ | 668.3 | 5500.4 | 0 | 0 | 1522.4 | 0 | 0 | 0 |
| $O_2$ | 0 | 0 | 0 | 0 | 0 | 0 | 0 | 0 |
| $N_2$+Ar | 4.1 | 33.7 | 0 | 0 | 9.4 | 0 | 0 | 0 |
|  |  |  |  |  |  |  |  |  |
| $C_2$ | 22.3 | 183.5 | 0 | 0 | 50.9 | 0 | 0 | 0 |
| $C_3$ | 3.8 | 31.4 | 0 | 0 | 8.7 | 0 | 0 | 0 |
| $C_4$ | 0.7 | 5.8 | 0 | 0 | 1.5 | 0 | 0 | 0 |
| $C_5$ | 0.4 | 1.2 | 0 | 0 | 0.3 | 0 | 0 | 0 |
| $C_6$ | 0.3 | 2.3 | 0 | 0 | 0.6 | 0 | 0 | 0 |
| TOTAL IBMOL/HR | 704.7 | 5799.5 | 500 | 10021.7 | 11627.0 | 2335.4 | 6110.12 | 6192.6 |
| TEMPERATURE °C | 30 | 15 | 293 | 293 | 494.4 | 150 | 150 | 60 |
| PRESSURE BAR | 33 | 80 | 80 | 80 | 80 | 3.8 | 3.8 | 110 |

FIG. 3

GENERATING POWER FROM NATURAL GAS WITH CARBON DIOXIDE CAPTURE

CLAIM OF PRIORITY

This application claims priority under 35 U.S.C. §120 to U.S. Utility application Ser. No. 12/763,081, filed Apr. 19, 2010 and also claims priority under 35 U.S.C. §119 to U.S. Provisional Application No. 61/170,475, filed Apr. 17, 2009, the entire disclosure of which is incorporated herein by reference.

TECHNICAL FIELD

This invention relates to generating $H_2$+CO synthesis gas products and, more particularly, to generating power from natural gas or hydrocarbons with carbon capture.

BACKGROUND

Natural gas and hydrocarbons are a major fuel source for electrical power generation using combined cycle gas turbine/steam turbine systems. There is an urgent need to develop means to capture $CO_2$ for sequestration in geological formations to avoid emitting $CO_2$ in the gas turbine exhaust to the atmosphere where it will contribute to temperature rise and overall global warming. In order to produce power from natural gas fuel with $CO_2$ capture, it is necessary to first convert the natural gas to a mixture of hydrogen and carbon monoxide synthesis gas ($H_2$+CO) using partial oxidation (POX) or catalytic steam/natural gas reforming (SMR) or autothermal reforming (ATR). This is followed by catalytic shift conversion of CO with steam to $CO_2$ and $H_2$. The reactions (based on methane) are:

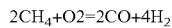

$2CH_4+O2=2CO+4H_2$

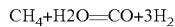

$CH_4+H2O=CO+3H_2$

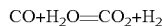

$CO+H_2O=CO_2+H_2$ $CO_2$ is removed from the synthesis gas by scrubbing with a physical or chemical solvent or by other means producing a substantially pure $CO_2$ product stream and a substantially pure $H_2$ stream with a minimum content of CO and $CH_4$ and $CO_2$. The $H_2$ product is preferably then mixed with a maximum quantity of $N_2$ from the air separation unit to produce an $H_2$+$N_2$ stream which can then optionally be preheated to give an optimum fuel for the gas turbine.

SUMMARY

The present invention is directed to generating power from natural gas with $CO_2$ capture for sequestration, for example, in a geological formation, in connection with the generation of a fuel gas substantially free of carbon containing components for power generation. In some implementations, a method includes combining high efficiency power generation from a natural gas fed gas turbine combined cycle systems with $CO_2$ captured for sequestration. In some cases, this example method may eliminate, minimize or otherwise reduce $CO_2$ emissions to the atmosphere in connection with generating synthesis products. Countries such as the United States, United Kingdom, and other European countries produce a significant portion of electric power from natural gas and using this example method may reduce the emissions of green house gases.

In some implementations, one or more methods can include producing a hydrogen rich fuel gas for a gas turbine ballasted with nitrogen and optionally steam and superheated to a temperature above its dew point. The fuel gas may have a minimal or reduced content of $CO_2$ or fuel components CO and $CH_4$ which contain carbon so that, when combusted in a suitable gas turbine, there may be minimal or reduced emissions of $CO_2$ to the atmosphere. These example methods may result in a capture of the bulk of the carbon present in the total natural gas feed as $CO_2$ compressed to pipeline delivery pressure for sequestration.

In some implementations, one or more methods can achieve an overall net electrical generation efficiency of greater than 47% in accordance with the Lower Heating Value (LHV) basis at International Organization for Standardization (ISO) conditions such as in the range approximately from 49% to 51% using, for example, published data for the GE 7B gas turbine performance. Simultaneously, the carbon captured from the natural gas feed as $CO_2$ compressed to pipeline pressure may be greater than 80% and, in some implementations, greater than 89% of the total feed carbon.

In some implementations, one or more disclosed methods can generate the $H_2$+$N_2$+(optional steam) superheated fuel gas in a process system in which substantially all auxiliary power required for oxygen/nitrogen production and compression, $CO_2$ separation and compression to pipeline pressure, and other minor power consumers associated with the total fuel gas generation system is generated internally within the fuel gas generation system. In other words, such systems may operate independent of external power supplies and without imported power from, for example, the gas turbine combined cycle power generation system.

It is the object of this invention to show a novel arrangement of heat exchange to maximize efficient heat recovery to produce the best quality fuel gas for the gas turbine and provide all the power required for the fuel gas generation system. It is a further objective of the invention to produce the synthesis gas from a combination of POX/GHR plus a steam boiler in a single compact vessel to allow the system to be modularized at large sizes to minimize or otherwise reduce erected capital cost.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 2 and 3 illustrate example operating conditions for the system in FIGS. 1A and 1B;

DETAILED DESCRIPTION

Figure 1A:
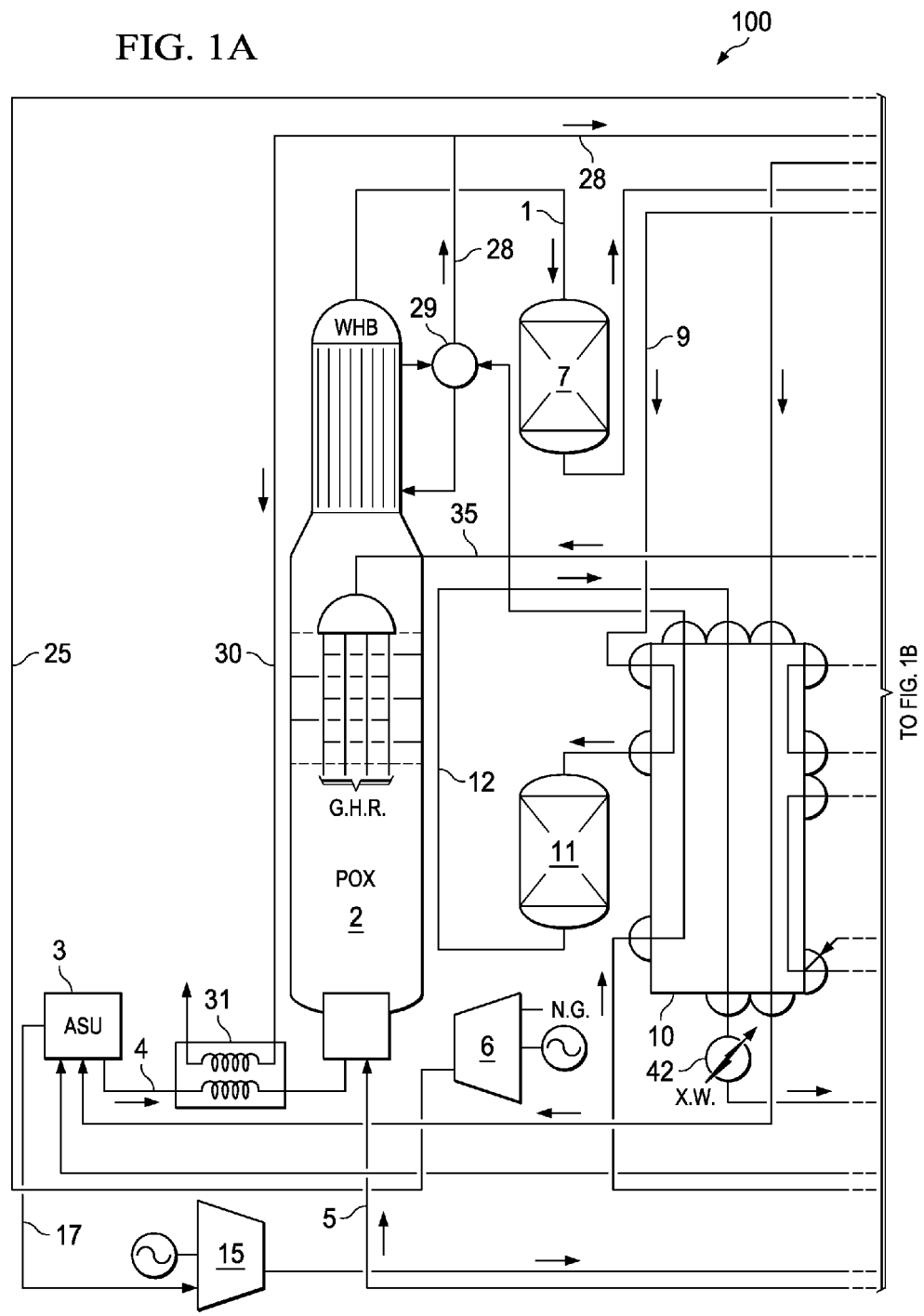
FIGS. 1A and 1B are block diagrams illustrating a system for generating power and sequestering $CO_2$ in accordance with some implementations.

In some implementations, one or more methods include producing $H_2+N_2$+(optional steam) fuel gas for a gas turbine combined cycle electric power generation system. For example, a synthesis gas system may include a combined partial oxidation reactor (POX) and gas heated catalytic reformer (GHR) (POX/GHR) syn-gas generation reaction to produce a $CO+H_2$ syn-gas at 60 bar to 100 bar pressure by using a very high steam to active carbon ratio in the GHR of 5 to 12 to limit $CH_4$ slip from the GHR. In addition, power for an Air Separation Unit (ASU) to produce oxygen for the POX may be provided by a gas turbine which is discharging its exhaust through a fired process heater to provide heating and superheating duties of the feed natural gas/steam/oxygen flows to the POX and GHR. Conventional high and low temperature shift reactors convert the bulk of the CO in the syn-gas to $H_2$ and $CO_2$ by reaction with steam in catalytic reactors. Heat is recovered by preheating boiler feed-water. Excess heat produced at lower temperature levels is used for preheating and optionally also for humidification of the product fuel gas stream.

In the present arrangement, the ASU may deliver substantially all nitrogen plus argon in the air feed as an additional compressed nitrogen product containing, for example, no more than 1.0% oxygen for blending with the hydrogen rich stream. The nitrogen may be mixed with the hydrogen rich stream following $CO_2$ removal using a conventional physical and/or chemical scrubbing process such as, for example, Selexol or MDEA In some implementations, the POX/GHR combination can have a very low oxygen requirement that limits the nitrogen flow to about ⅔ of the hydrogen flow.

The synthesis gas leaving the GHR reactor is passed through a heat recovery steam boiler which generates a substantial part of the high pressure process steam requirement of the synthesis gas generation system with the remaining portion being generated in the gas turbine exhaust fired process heater. This fired heater also superheats the steam and heats the natural gas to the high temperature required for the feeds to the synthesis gas generation system. Lower temperature heat is recovered from the fired heater for feed-water preheating and low pressure steam generation. The heat content of the synthesis gas leaving the steam boiler together with the heat generated in the high and low temperature catalytic shift reactors must be efficiently recovered at the highest possible temperature levels for natural gas preheating, process feed-water and boiler feed water preheating, low pressure steam generation for the CO2 removal system and for fuel gas preheating with optional humidification of the fuel gas stream. The optional steam generation for blending with the $H_2+N_2$ mixture may be maximized or otherwise increased by heat recovery from cooling syn-gas and shift heat of reaction such that the $H_2$ content in the gas turbine fuel may be reduced to 40% to 60% by volume range. This reduction may be accomplished by mixing the $H_2+N_2$ at a temperature in the range ambient to 60° C. together with sufficient liquid water to optimally recover substantially all medium to low grade heat available over the temperature range of the cooling $H_2+H_2O+CO+CO_2+CH_4$ syn-gas stream. As the $H_2+N_2$+liquid water is heated, the water may progressively evaporate as the temperature rises to recover substantially all the available process heat.

Heat in the form of low pressure steam at, for example, 3 bar to 5 bar pressure may also be used for regeneration of the $CO_2$ liquid solvents in the $CO_2$ scrubbing system. This steam may be generated at the higher temperature levels as the syn-gas mixture cools leaving the medium and lower temperature levels for heat recovery to the $H_2/N_2$/steam flow.

In aggregate, substantially all heat recovery may be carried out in a multi-channel plate/fin heat exchanger where syn-gas streams are cooled and where precise $H_2+N_2$ gas and liquid water flows may be introduced into each of the heating passages. This heat exchanger may also act as a low pressure steam generator and may also cool excess air bleed from the gas turbine compressor section used as part of the ASU feed air stream.

In some implementations, the new process can retain the 60 bar to 100 bar syn-gas generation pressure to minimize or otherwise reduce the size of the syn-gas POX/GHR/WBH units and to utilize the excess pressure by expanding the exit gas from the Waste Heat Boiler (WHB) in a power producing pressure let-down turbine. In some instances, the power producing pressure let-down turbine may operate at an inlet pressure of 60 bar to 100 bar and an outlet pressure of from 25 bar to 35 bar.

In some implementations, one or more of the following may be included: POX/GHR/gas turbine combination; high pressure (>60 bar) syn-gas pressure; high steam to active carbon ratio in GHR for low $CH_4$ slip; $N_2$/steam/$H_2$ fuel superheated for gas turbine; preheat and superheat of syn-gas feeds in the gas turbine exhaust fired heater; POX/GHR/WHB shown as a single composite vessel; heat recovery from syn-gas WHB exhaust+shift heat of reaction as steam content in pressurized gas turbine fuel gas stream and/or other aspects.

In some implementations, one or more methods can limit the amount of $N_2$ available for blending with the $H_2$ to about ⅔ of $H_2$ flow. Gas turbines may operate with as low as 40% $H_2$ giving scope for a large content of steam in the $H_2/N_2$/steam fuel gas mixture. In some implementations, this large steam generation can be from the heat recovery as sensible and shift reaction heat from the WHB exhaust down to ambient temperature. Injecting a liquid and gas in a controlled manner into a single passage or pass of a heat exchanger may progressively evaporate the liquid as the temperature of the stream rises due to the heat transfer. This may result in maximizing or otherwise increasing the heat transfer to the evaporating liquid over a temperature range. The type of heat exchanger used may be a plate-fin multi-stream heat exchanger of a type typically manufactured by companies such as Sumitomo, Chart and Linde. Substantially the entire heat transfer downstream of the WHB may take place in a stainless steel plate-fin brazed multi-steam, multi-channel heat exchanger. The prime duty of this heat exchanger may be to heat a $H_2+N_2$ stream with controlled liquid water content to evaporate substantially all of the water over a progressively increasing temperature range. The liquid water and $H_2+N_2$ gas streams may be separately fed into a single heat exchanger pass made of a plurality of separate passages. The heat exchange design may allow a controlled water fraction to mix with a controlled gas fraction at the inlet of each passage. The design may be capable of ensuring a reasonable ratio of gas to liquid within defined limits to be established in each passage. Any excess heat particularly heat available at the highest temperature level may be used to produce low pressure steam for heating regeneration of the $CO_2$ absorption system. In some implementations the gas turbine fuel stream may be substantially free of water vapor in order to limit the partial pressure of water vapor in the gas turbine expander section to maximize the expander turbine section inlet temperature and thus maximize the gas turbine power output.

The generation of syn-gas at 60 bar to 100 bar pressure may be a feature peculiar to the use of a POX/GHR combination coupled to a high steam to carbon ratio in the GHR which may limit $CH_4$ slip and maximizes or otherwise increases $CO_2$ capture. The gas turbine may use a fuel pressure in the range from 25 bar to 35 bar. A power producing high temperature pressure let down turbine may be used to reduce the temperature and pressure of the gas mixture leaving the WHB thus increasing overall efficiency of power production.

Figure 1B:
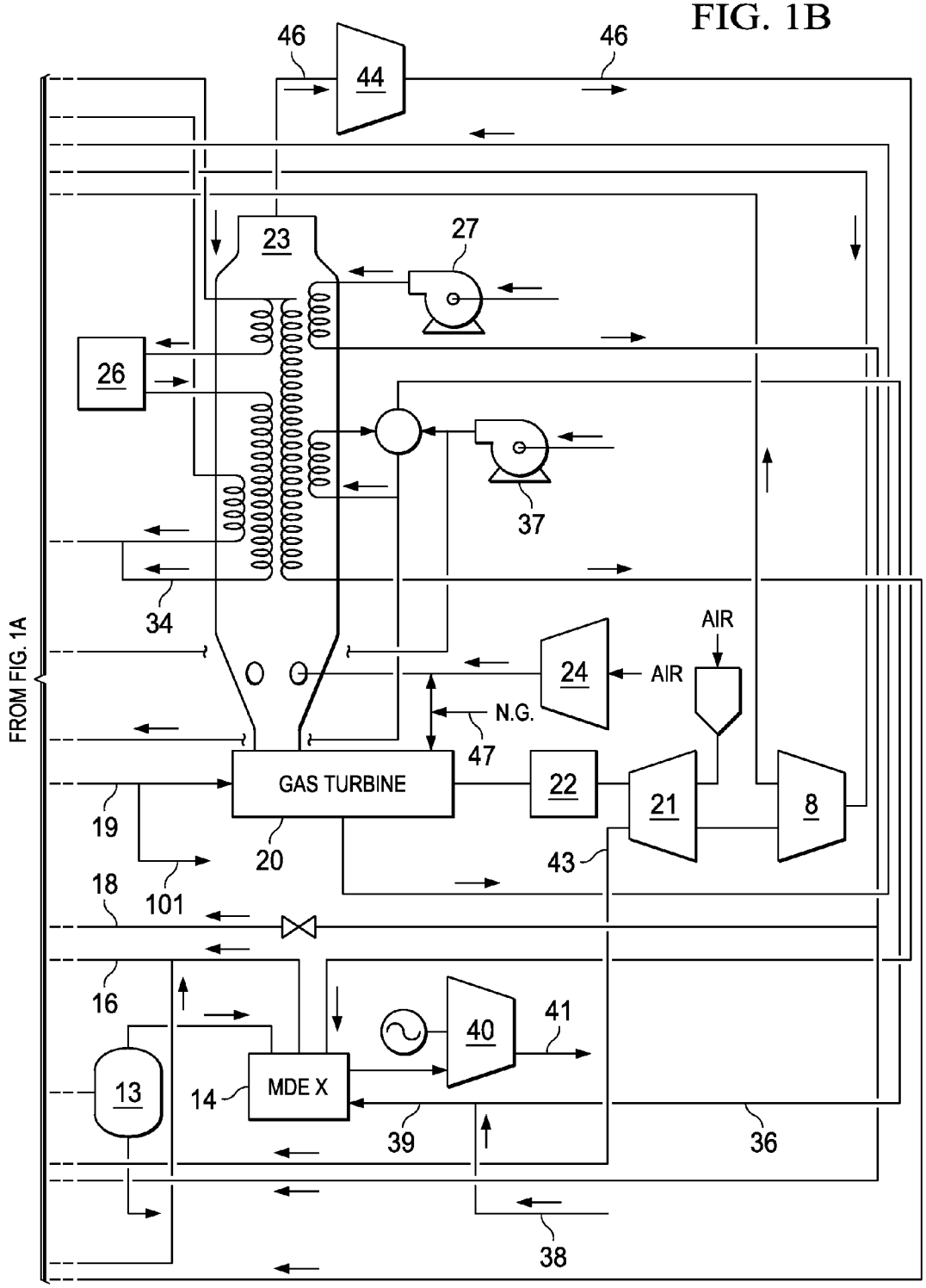

FIGS. 1A-1B illustrates an example synthesis system 100 for generating power and sequestering $CO_2$ in accordance with some implementations of the present disclosure. In various implementations, a feed stream is processed to produce synthesis gas (e.g., streams including hydrogen, carbon monoxide and carbon dioxide) streams. The processed feed streams may include a variety of feed streams that include methane, such as natural gas, hydrocarbon fuels, methane rich gases such as coalbed methane or biogas (e.g., stream produced from the anaerobic decay of matter). The feed streams may include liquid or gaseous hydrocarbons, such as natural gas and liquefied petroleum gas and distillates. In reference to FIGS. 1A-1B, the feed gas 25 enters the synthesis gas reactor 2.

In some implementations, the synthesis gas reactor 2 can include a combined synthesis gas generation system that integrates a partial oxidation reactor (POX) and a gas heated catalytic reformer (GHR) (e.g., a convectively heated steam/hydrocarbon catalytic reformer) such that the synthesis gas produced by the POX is mixed with the synthesis gas from the GHR. The combined stream may be used to heat the GHR (e.g., since the synthesis gas produced by the POX and the GHR may have a temperature sufficient to heat the feed natural gas and steam mixture entering the GHR to produce synthesis gas), which is discussed in more detail with respect to FIG. 4.

The combined stream, that includes synthesis gas, may leave the shell side of the GHR cooled and be further cooled in a waste heat boiler (WHB). In three-stage synthesis gas generation systems, the WHB may be an integrated stage of the synthesis gas generation system as illustrated in reactor 2. In two-stage synthesis gas generation systems, the WHB may be a separate reactor. The heat from the combined stream leaving the shell side of the GHR may heat boiler feed water to produce steam from separator 29 to be utilized by the GHR as illustrated by stream 28 and as steam stream 30 for pre-heating the $O_2$ stream 4 in steam heater 31. The steam 28 may be produced by the WHB at a pressure sufficiently high to allow the steam to be mixed with the hydrocarbon fuel for the GHR and/or the POX. In some implementations, the resulting steam and feed stream may be further pre-heated by an external means.

The $H_2$+CO syn-gas which also contains $CO_2$, $H_2O$, $CH_4$ and a little $N_2$ and Argon (A) is produced as stream 1 from the combined POX/GHR/WHB reactor 2. The Air Separation Unit (ASU) 3 may produce an oxygen stream 4 which may be used to partially oxidize a natural gas stream 5, optionally compressed in compressor 6 and preheated in the gas turbine exhaust fired heater 23, to produce a syn-gas stream which mixes with syn-gas generated in the GHR and the combined stream then flows through the shell-side passes over the catalyst filled tubes of the GHR then through the WHB.

The syn-gas stream 1 passes through a high temperature catalytic shift conversion reactor 7 and is reduced in pressure in the power producing expansion turbine 8. The expanded syn-gas stream 9 is cooled in the multi-channel stainless steel plate-fin heat exchanger 10 then passed through a low temperature catalytic shift conversion reactor 11. The exit $H_2$+$CO_2$ gas stream 12 then re-enters the plate-fin heat exchanger 10 where it is cooled followed by cooling to near ambient temperature against cooling water in heat exchanger 42. Liquid water is separated in 13 and $CO_2$ is removed in the MDEA double flash system 14. Nitrogen 17 from the ASU 3 is compressed in 15 and mixed with the $H_2$ stream leaving the MDEA unit. The $H_2$+$N_2$ stream 16 enters the base of the plate-fin heat exchanger 10 via a liquid/gas distributer system where pre-heated purified water 18 is precisely mixed in the required liquid to gas ratio in each of the passages. The $H_2$+$N_2$+steam gas mixture 19 leaves the plate-fin heat exchanger 10 typically 50 DEG C above its dew point. Part of this is then used as fuel for the gas turbine 20. The bulk of this stream 101 becomes the fuel gas feed stream to a gas turbine combined cycle power generation system operating on a substantially $CO_2$ free stream.

The gas turbine 20 drives an air compressor 21 providing air stream 43 for the ASU 3, and an electrical generator 22. Optionally units 20, 21, 22 and 8 can all be mechanically linked. The gas turbine exhaust enters a fired heated 23 where additional natural gas is burned in a burner supplied optionally with its own air supply from a blower 24.

A compressed natural gas stream 25 leaving compressor 6 is preheated in the heater 23 then de-sulphurized in a sulphur removal system 26. A boiler feed-water stream pumped to high pressure in 47 is preheated in heater 23 and further heated to a temperature near its boiling point in heat exchanger 10. The heated boiler feed water is vaporized in the WHB shown with natural circulation of water feed and a steam separator 29.

The steam produced is split with part 30 being used to preheat oxygen feed to the POX burner in heat exchanger 31. The major part of the steam flow 28 is superheated in heater 23, mixed with heated de-sulphurized natural gas 34 and the combined natural gas/steam stream 35 is the feed to the GHR in 2. An additional low pressure steam stream 36 is produced partly in the hot end of heat exchanger 10 and partly in heater 23 from a boiler feed-water stream pumped in 37. An additional steam stream 38 from the combined cycle steam system is optionally added to stream 36 and the combined low pressure steam stream 39 is used for regeneration duty in the $CO_2$ scrubber 14. The $CO_2$ stream 41, separated in 14, is compressed to pipeline pressure in 40. Optionally, the exhaust gas from the heater 23, stream 46, can be boosted in pressure in fan 44 to remove any back pressure on the gas turbine and to provide sufficient pressure in the discharge stream 45 to allow the waste gas to be routed through a separate scrub column in the MDEA system 14 to remove the bulk of the $CO_2$ in stream. This may be used if substantially all of stream 19 is used as fuel for the combined cycle power generation system and the gas turbine 20 optionally uses natural gas fuel.

An optional specification for the total fuel gas stream would be to produce a dry fuel gas stream in which case fuel gas stream would contain about 60 mol % H2 with a minimum content of CO and $CH_4$ and with the balance being $N_2$. This stream would provide the fuel gas to the gas turbine combustor. In addition there would be required an additional nitrogen or air stream at a pressure corresponding to the combustion chamber pressure which would provide an additional diluents for the combustion products before they enter the expander section of the gas turbine. A typical gas turbine such as the GE 7B would require a fuel gas pressure of 32.5 bar and a diluent $N_2$ or air pressure of 23.1 bar. both the dry fuel gas and the diluent $N_2$ or air stream would be heated in the plate-fin heat exchanger 10 to the maximum possible temperature.

The process conditions given in the tables 202 and tables 204 of FIGS. 2 and 3 produce a superheated feed stream of fuel gas which is used in a gas turbine cogeneration system to produce electric power. The mass and heat balance is given for the dry feed case based on projected performance for a GE 7B gas turbine using $H_2$ fuel derived from natural gas having a heating value (LHV basis) of 931.98 btu/scf and containing 4.28 mol % $CO_2$. The auxiliary gas turbine was a GE LM2500PE direct drive unit with a shaft power of 23.25 Mw. The overall net efficiency of the whole system is calculated to be 45.6% (lower heating value basis). The corresponding overall $CO_2$ recovery from the total natural gas feed is 90.3%. The total net power is 307.3 MW. The total $CO_2$ captured and compressed to pipeline pressure is 122.2 metric ton per hour. Though, these values and parameters are for illustration purposes only and the system 100 may use some, all or none of these without departing from the scope of this disclosure.

Figure 4:
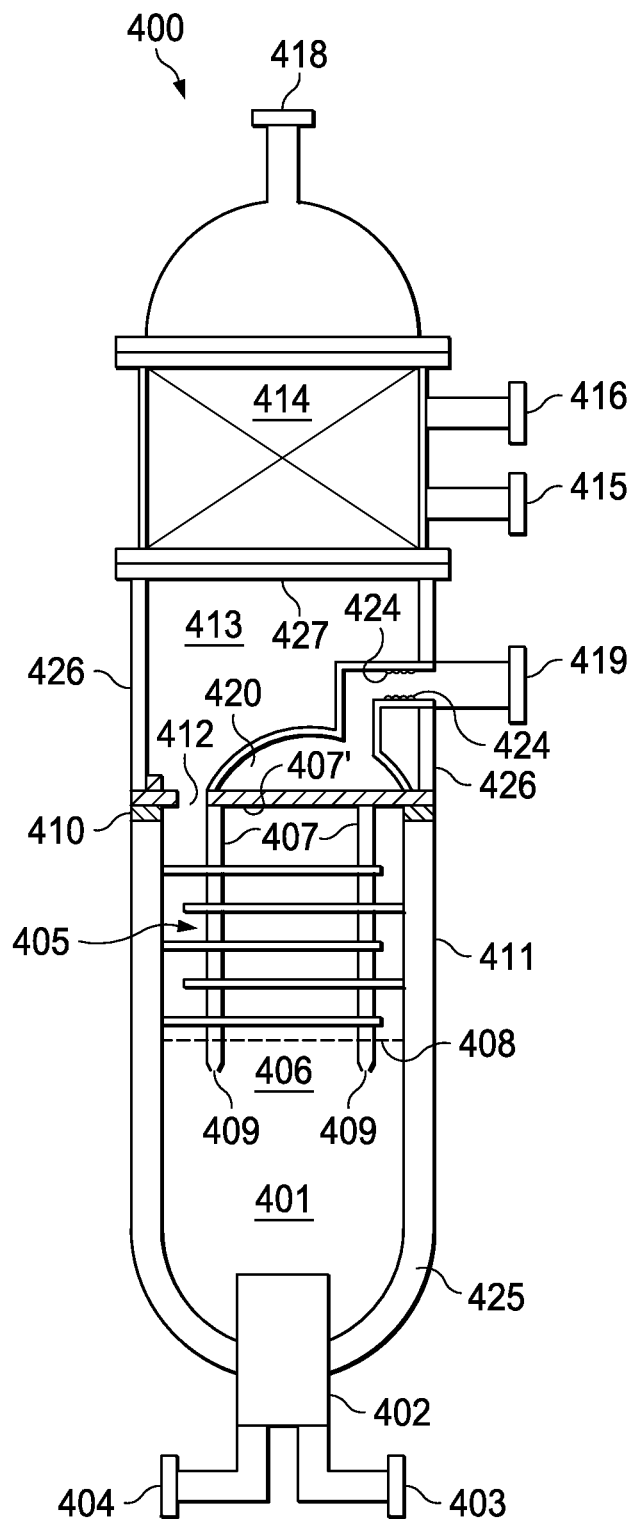
FIG. 4 illustrates an example combined synthesis gas generation system.
Figure 5:
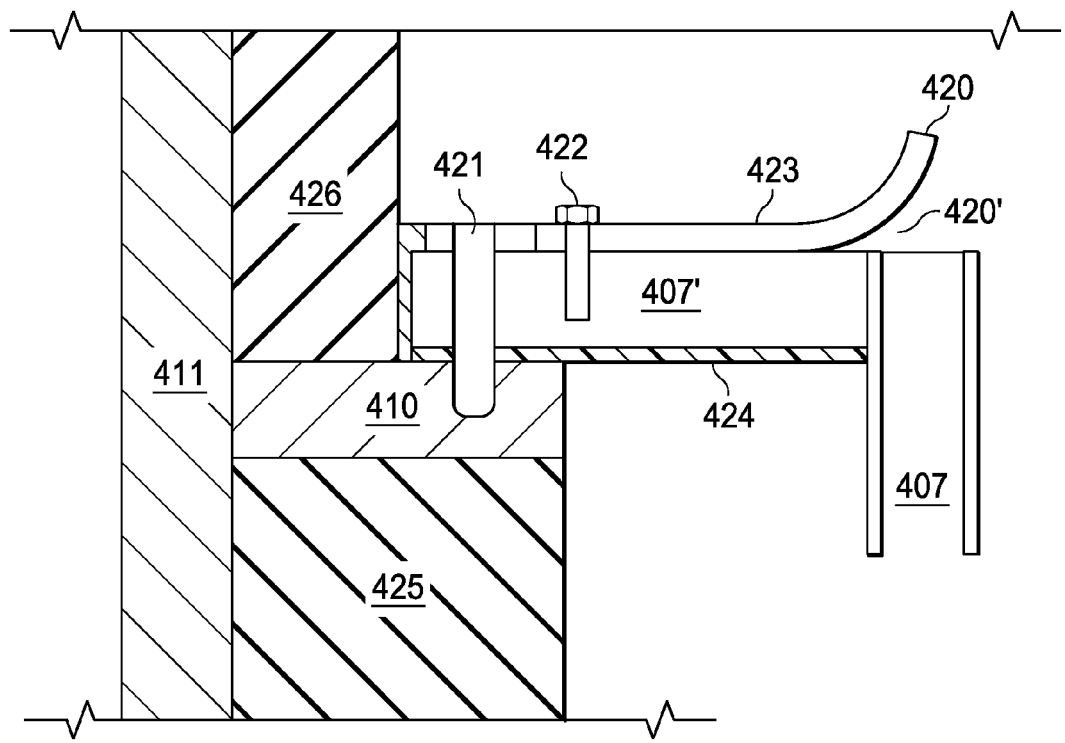
FIG. 5 illustrates a portion of the example combined synthesis gas generation system illustrated in FIG. 4.
Figure 6:
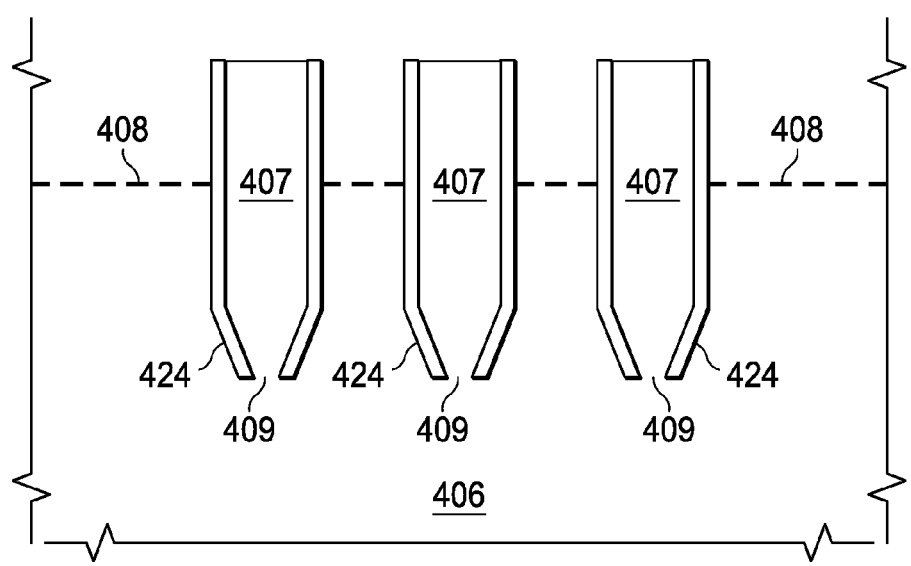
FIG. 6 illustrates another portion of the example combined synthesis gas generation system illustrated in FIG. 4.

FIG. 4 illustrates an example synthesis gas generation system 400 and FIGS. 5 and 6 illustrate portions of the synthesis gas generation system 400. Conventionally, the POX, GHR, and WHB are built as three separate units, for example, separate pressure vessels linked by pipes and located in a support structure. The general arrangement requires expensive internally insulated piping and/or high alloy steel piping, and associated supports, etc. A combined synthesis gas generation system may reduce costs (e.g., since less expensive piping may be used and since connections between previously separate units may be eliminated) while maintaining the process and operating and maintenance and safety features desired in a synthesis gas generation system. Another feature of a single reactor unit for the sequential operations of partial oxidation, autothermal reforming and optionally waste heat recovery, is to generate steam internally so that the synthesis gas stream passes through the composite unit without requiring the synthesis gas to pass through any piping connection between the units.

The illustrated synthesis gas generation system 400 illustrated is a three-stage synthesis gas generation system in which the POX stage 401, GHR stage 405, and WHB stage 414 are arranged vertically. A vertical arrangement may decrease the footprint required for the combined synthesis gas generation system when compared with conventional combined gas generation systems and/or conventional separate unit gas generation systems. Reducing the footprint of the system may be more cost-effective (e.g., reduce land requirements), allow the system to be positioned in reduced footprint environments, and/or allow the combined synthesis gas generation system (e.g., together with other components of the overall process) to be fabricated as a single module of compact dimensions and minimum weight.

As illustrated, the POX stage 401 is positioned proximate the bottom of the synthesis gas generation system 400. The WHB stage 414 is positioned proximate the top of the synthesis gas generation system 400 and the GHR stage 405 is positioned between the WHB stage and the POX stage. The POX stage 401 may include a POX burner assembly 402 that includes a fuel feed inlet 403 and another inlet 404. An oxygen stream and/or a steam stream may be provided to the POX stage 401 through the other inlet 404. The burners of the burner assembly 402 may be configured to inhibit zones of little or insignificant mixing in the POX stage 401. For example, the burners may be configured to produce a stable vortex flow.

A mixing space 406 may reside above the POX stage 401 and below the tubes 407 of the GHR stage 405. The mixing space 406 may include sufficient volume for efficient mixing of the high temperature gases produced by the POX stage 401 and the outlet gases from the tubes 407 of the GHR 405 and/or for sufficient residence time for the high temperature reactions. This may produce the maximum yield of synthesis gas while minimizing the production of solid carbon particles. The tubes 407 may be at least partially filled with a catalyst appropriate for the catalytic steam reformation of feed stream entering the GHR stage through GHR inlet 419 which corresponds to stream 35 in FIGS. 1A-1B. The tubes 407 of the GHR stage 405 may include a restriction 409 (e.g., an outlet nozzle) to increase the gas discharge velocity. Increasing the gas discharge velocity may promote good mixing between the POX and GHR product gas streams. The mixing may also be promoted by arranging a perforated plate 408 in the combined gas flow stream (e.g., combined gas from the tubes 407 of the GHR stage 405 and the POX stage 401). The plate 408 is located above the outlet nozzles 409 of the GHR tubes 407. A particulate layer (e.g., particulate layer 860 in FIG. 8) may include solid granules or solid formed pellets 860 may be placed above the perforated plate. These granules or pellets may include an inert material such as alumina or silica, or other inert materials capable of withstanding the operating temperature. The granules or pellets may filter at least a portion of the carbon particles produced in the POX reactor to prevent excessive carryover to the GHR reactor. The carbon trapped on the surface of these granules or pellets will quickly react with excess steam present in the combined synthesis gas stream (e.g., at the operating temperatures of greater than 1000° C.), and this continuous removal of deposited solid carbon will inhibit blockage due to the solid carbon. In some implementations, the granules or pellets may include catalysts, such as catalysts to promote the water gas shift reaction. See eqn. (1). This may establish a close approach to equilibrium which will allow, under the high temperature conditions, conversion of part of the carbon dioxide present in the synthesis gas stream to carbon monoxide by exothermic reaction with hydrogen. This also may lower the synthesis gas temperature.

$$CO_2 + H_2 = CO + H_2O \qquad \text{(eqn (1))}$$

The tubes 407 of the GHR stage 405 may be coupled (e.g., affixed) to a tube sheet 407' as shown in FIG. 5. The tube sheet 407' may be supported on a support ring 410 that is coupled (e.g., welded) to the shell 411 of the POX stage 401 and GHR stage 405. The position of the GHR tube sheet 407' on the support ring 410 may be retained by coupling members 421 (e.g., studs, bolts, etc.).

A GHR feed stream, which may include steam and/or a portion of the hydrocarbon feed, may flow into the GHR stage 405 through a GHR inlet 419. The GHR inlet may include a flexible portion 424 to, for example, compensate for thermal expansion when the unit is at its operating temperature. The GHR stage 405 may include a header cover 420 proximate a top of a GHR stage. The header cover 420 may be coupled, off center, to a top flange of the GHR stage 405 using a coupling member 422 (e.g., studs, bolts, etc.) so that it covers (at least a portion of) the top section of the GHR tubes 407. The entire top section of the GHR tubes 407 may be covered by the header cover 420. An internal portion of the inlet nozzle 419 may be detached from the vessel wall 411 to facilitate the removal of the GHR top header 420 and/or allow access to each of the catalyst filled reactor tubes.

As illustrated, the GHR stage 405 includes a segmentally baffled shell side. The shell side of the GHR stage 405 has a segmental cut-out 412 in the tube sheet to allow the synthesis gas stream to pass out of the shell side of the GHR stage 405 into the space 413 below the WHB stage 414. The WHB stage 414 includes, coupled to the shell side, a boiler feed-water inlet pipe 415 (e.g., proximate the base of the WHB stage) and an outlet steam or steam plus water carryover pipe 416 (e.g., proximate the top of the WHB stage). The WHB stage 414 includes a top cover 427 with a synthesis gas outlet pipe 418.

As illustrated, the GHR feed stream may be provided through GHR inlet 419 to the area 420', which is enclosed by the header cover. The GHR feed stream may flow from the area 420' enclosed by the header cover 420 into the tubes 407. The header cover may inhibit communication between the inlet feed in pipe 419 and the product gas in space 413. At least portions of the GHR feed stream may undergo catalytic steam reformation to produce synthesis gas. The product stream may exit through the nozzles 409 of the tubes 407 to mix with the gases from the POX stage of the combined synthesis gas generation system. This combined stream may flow through the perforated plate 408 to the shell side of the GHR stage to provide heat to the tubes for the catalytic steam reformation of the GHR feed stream in the tubes 407. By providing heat to the stream in the tubes 407, the combined gas stream may be cooled.

The cooling and heat transfer from the shell side synthesis gas flow may be enhanced by including regularly spaced horizontal baffles (e.g., vertically separated, which direct the shell side flow over the outside of the tubes 407 in an optimum manner consistent with constraints of pressure drop through the shell side of the GHR 405). As illustrated the baffles have segmental cutouts alternatively arranged to facilitate the flow of shell side gas from one baffle space to another. The baffle arrangement allows the cut-out in the tube sheet to coincide with baffle size and location relative to the tube bundle so that the shell side gas flow may exit though the tube sheet cut-out 412. In some implementations, a disc and doughnut baffle arrangement may be utilized. The cooled gas stream may exit the shell side of the GHR stage 405 at opening 412 to flow into the space 413 disposed between the WHB stage 414 and the GHR stage 405. The cooled gas stream may then flow into the tube side of the WHB stage 414 and provide heat to produce steam from the feed water from inlet 415, which may further cool the cooled combined gas stream. The produced steam or steam plus water may exit the WHB at outlet 416. Part or all of the steam stream optionally with further processing which may include further heating could be provided to the GHR stage 405 and/or the POX stage 401. The further cooled combined synthesis gas stream may exit the WHB stage and/or the combined synthesis gas system at synthesis gas outlet 418.

In some implementations, the exposed metallic portions or portions thereof (e.g., exposed metallic portions including optionally the exposed surface of the WHB tube sheet) in the space 413 may include a protective coating 423 (e.g., the coating may be coated, the coating may be a top layer of the portions, the coating may be a removably coupled layer, etc.). The protective coating 423 may be substantially gas impermeable and/or be applied after the GHR stage 405 has been installed with header cover 420. The protective coating 423 may be removed if the GHR bundle needs to be replaced in the future. Protective insulation may at least partially cover the coupling members 421 and 422. The lower side of the GHR tube sheet 409, or at least portions thereof, may be coated with a gas impermeable coating 424. The coating 424 may allow the tube sheet to be constructed from a less expensive material than the GHR tubes 407 (e.g., the GHR tubes may include nickel alloys such as 693 or 617. The vessel wall in the POX stage 401 and GHR stage 405 may be internally insulated with an insulation layer 425. The insulation layer 425 may include a permanent ceramic insulation. The vessel shell in the region of the space 413 may be internally insulated with an insulation layer 426, which may include, in some implementations, a permanent ceramic insulation.

Although an implementation of a three-stage synthesis gas generation system is illustrated in FIG. 4, various components and/or features may be added, deleted, and or modified. For example, the stages may be arranged horizontally or obliquely. As another example, the POX stage may be positioned proximate the top of a synthesis gas generation system. The GHR stage may be positioned proximate (e.g., adjacent, below, etc.) the POX stage and/or the WHB stage. The system may be arranged in a vertical or oblique configuration with the POX on top, followed by the GHR and with the WHB at the bottom. The vertical arrangement shown in FIG. 4 may allow the GHR tube bundle to be easily lifted out of the shell after removal of the waste heat boiler section. As another example, a pipe may be a conduit. In some implementations, other insulation layers 425 and/or 426 may include a different type of insulation. A cross-sectional area of a POX stage and a GHR stage may be approximately similar in size. In some implementations, the combined synthesis gas generation system may be a single pressurized vessel that includes three stages. As another example, the steam produced by the WHB stage may be combined with feed stream and/or provided to a preheater. The steam produced by the WHB stage may not be provided to a piping system external to the combined synthesis gas system, but rather provided internally to the POX stage and/or the GHR stage.

Figure 7:
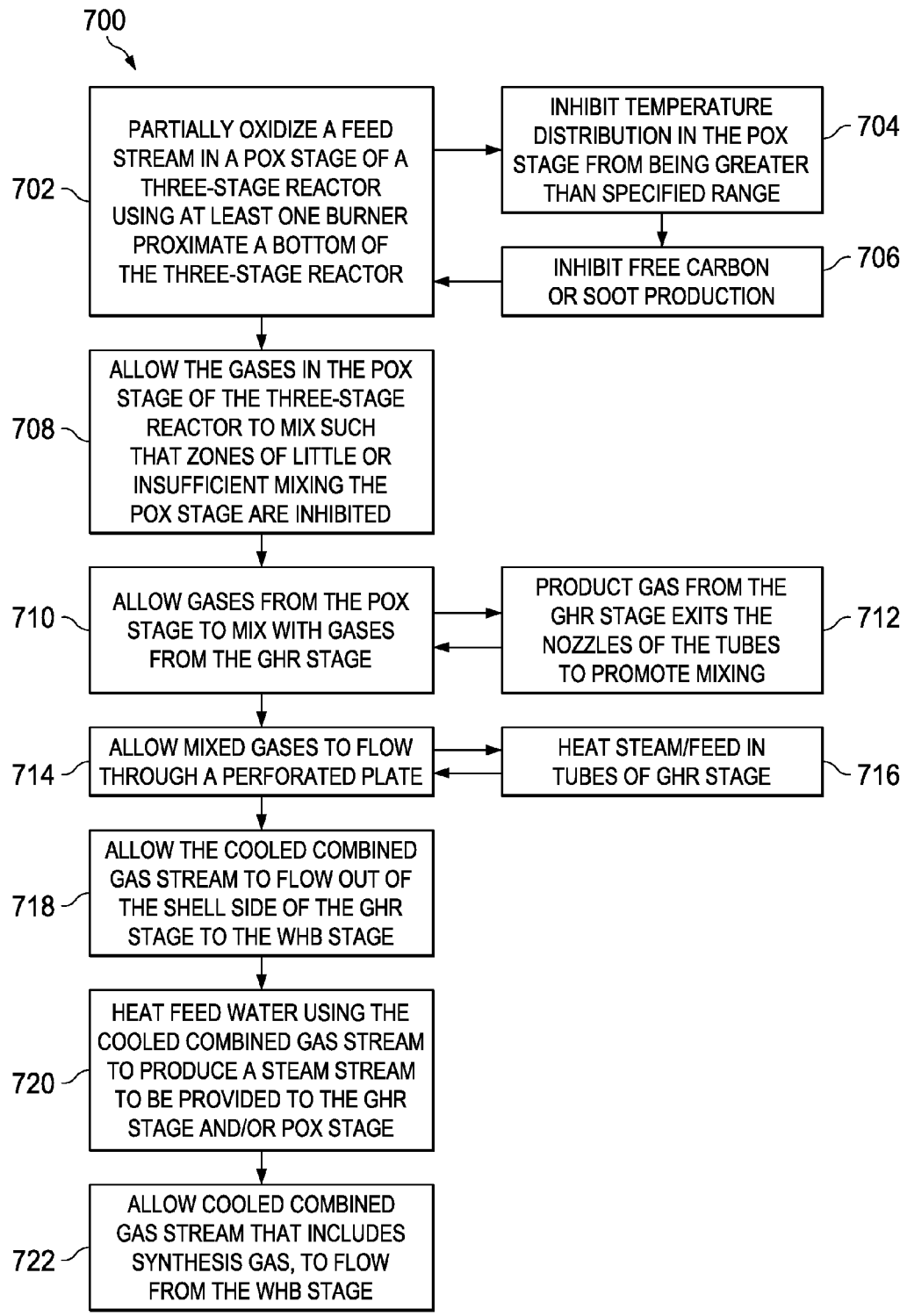
FIG. 7 illustrates a process of producing synthesis gas using the example system illustrated in FIG. 4.

FIG. 7 illustrates an example process 700 for producing synthesis gas using a combined synthesis gas generation system, such as the combined synthesis gas generation system illustrated in FIG. 4. A feed stream may be partially oxidized in a partial oxidation stage of a three-stage reactor using at least one burner proximate a bottom of the three-stage reactor (operation 702). For example, a natural gas stream, an air stream, and/or steam may be provided to a POX stage of a three-stage reactor. A temperature distribution in the POX stage greater than a specified range may be inhibited (operation 704). For example, the burner(s) of a POX may be designed to achieve a substantially even reaction temperature in the POX stage. Limiting zones of little or insignificant mixing may increase yields of synthesis gas, reduce costs of producing synthesis gas, and/or promote even reaction temperatures in the POX stage, for example. Free carbon and/or soot production may be inhibited (operation 706). For example, the burner(s) of the POX may be designed or selected such that free carbon or soot production is minimized.

The gases in the POX stage of the three-stage reactor may be allowed to mix (e.g., due to the flow pattern of the gases) such that zones of little or insignificant mixing in the POX stage are inhibited (operation 708). For example, the burners of the POX may be positioned such that zones of little or insignificant mixing is minimized or inhibited. A stable vortex flow in the POX stage may be produced to inhibit zones of little or insignificant mixing. The POX stage may have sufficient volume for efficient mixing of the high temperature gases produced by the burner to take place and for sufficient residence time for the high temperature reactions to take place, which may maximize the output of synthesis gas and minimize the production of solid carbon particles (e.g., zero or minimal carbon particle production).

The gases from the POX stage and the gases from the tubes of the GHR stage may be allowed to mix (operation 710). For example, the gases from the POX stage and the GHR stage may be allowed to mix in the mixing zone disposed between the tubes of the GHR and the POX stage. The gas from the tubes of the GHR may include synthesis gas produced by catalytic steam reformation of the feed stream and/or the steam stream entering the tubes of the GHR stage. Product gas from the GHR stage may exit from nozzles of the tubes to promote mixing between the gases from the POX and the tubes of the GHR (operation 712).

The combined gas stream may flow through a perforated plate (operation 714). For example, the combined gas stream may flow through a perforated plate positioned proximate the mixing zone to the shell side of the GHR stage. The perforated plate may support a particulate layer which can act as a carbon removal device and/or a catalytic section, to achieve equilibrium for the water gas shift reaction and/or cool the combined synthesis gas mixture. The shell side of the GHR may be baffled. Allowing the combined gas stream to flow through the perforated plate may impose a pressure drop across the perforated plate, which may cause a more even flow (e.g., when compared to flow without use of a perforated plate) across the perforated plate over a cross-section of the mixing space.

Steam and/or feed in the tubes of the GHR stage may be heated (operation 716). For example, the combined gas stream in the shell side of the GHR may provide heat to heat the stream in the tube side of the GHR stage.

The cooled combined gas stream may flow from the shell side of the GHR stage to the WHB stage (operation 718). The feed water to the WHB may be heated using the cooled gas to produce steam to be provided to the GHR stage and/or the POX stage (operation 720). The cooled combined gas stream may be further cooled by providing the heat to produce steam in the WHB. The cooled combined gas stream that includes synthesis gas may flow from the WHB (operation 722).

Process 700 may be implemented by various systems, such as system 100 and 400. In addition, various operations may be added, deleted, or modified. For example, in a two-stage combined synthesis gas reactor, operations 718, 720, and/or 722 may not be performed by the combined synthesis gas system. As another example, the steam stream produced may be provided to a pre-heater and/or mixed with a portion of a feed stream. In some implementation, the process 700, or portions thereof, may be performed by a two-stage reactor (e.g., a reactor that includes a POX stage and a GHR stage).

Figure 8:
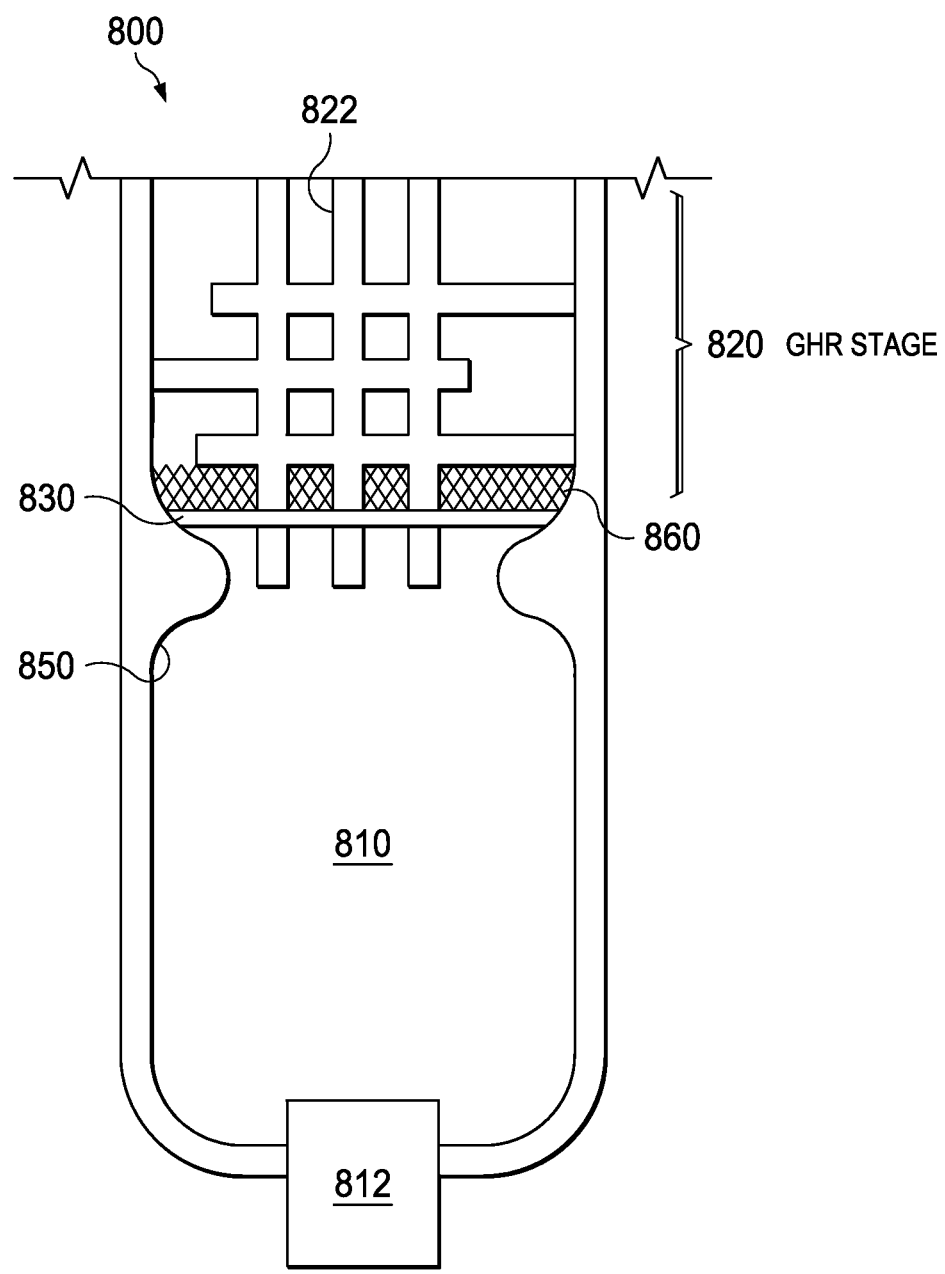
FIG. 8 illustrates a portion of an example combined synthesis gas generation system.

FIG. 8 illustrates a portion of an example synthesis gas generation system 800. As illustrated, the synthesis gas generation system 800 includes a two-stage reactor with an integrated POX stage 810 and GHR stage 820. A feed stream, oxygen stream, and/or steam stream may be provided to a burner 812 of the POX stage 810. The feed stream may be partially oxidized to produce synthesis gas. A feed stream and steam stream may be provided to the tube side of a GHR stage 820. In the tubes 822, which include a catalyst, at least a portion of the feed stream in the tubes may be catalytically steam reformed to produce synthesis gas. The gas stream from the tubes 822 of the GHR stage 820 and the gases in the POX stage 810 may be mixed and allowed to flow through the perforated plate 830. The combined gas stream may flow through the perforated plate 830 and the particulate layer 860 to the shell side of the GHR stage. Heat from the combined gas stream may be provided to the stream in the tubes of the GHR stage. Allowing the heat from the combined gas stream to be utilized to heat the stream in the tubes of the GHR side may provide cost-savings and produce a higher yield of synthesis gas.

Figure 9:
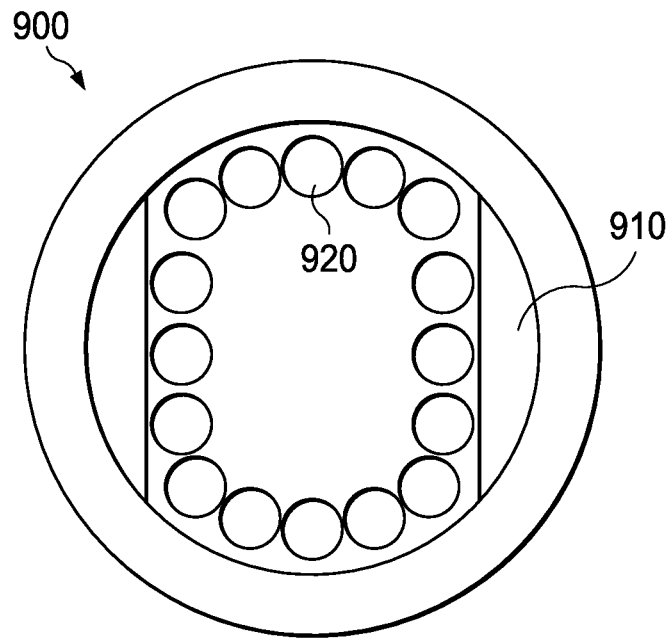
FIG. 9 illustrates an example cross-section of the example synthesis gas generation system illustrated in FIG. 8.
Figure 10:
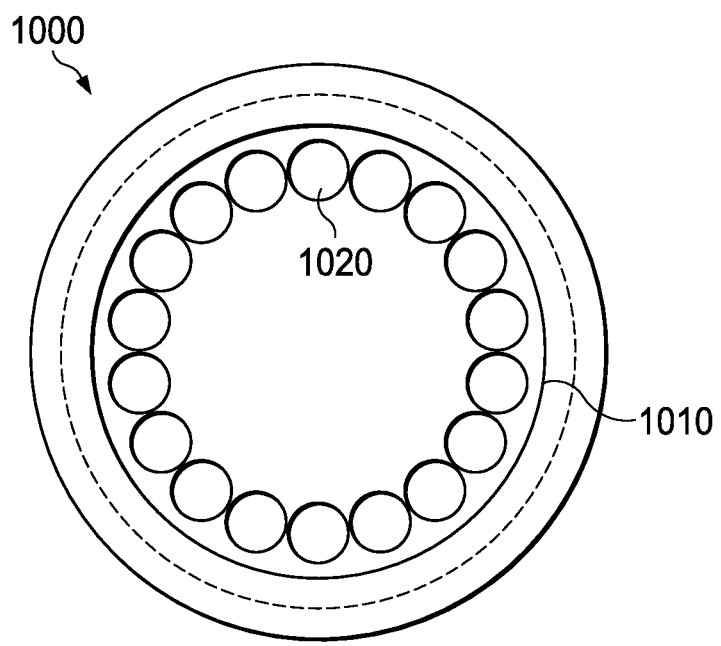
FIG. 10 illustrates an example cross-section of the example synthesis gas generation system illustrated in FIG. 8.

The shape of the top of the POX stage 810 may be such that the refractory internal vessel lining 850 is built up (e.g., so that protrusion(s) into a vessel cavity exist) and/or protrusions may be coupled to an internal area of the vessel so that the tubes 822 are approximately evenly distributed across the exit cross-section of the POX gas flow, as illustrated in FIGS. 8-10. FIG. 9 illustrates a cross-sectional view of a top portion 900 of a POX stage. As illustrated, two baffle segments 910 would be disposed proximate edges of the cross-section, assuming there were no tubes 920 through the baffle segments. As illustrated in FIG. 10, for a disc and doughnut arrangement GHR, a cross-section 1000 of which is illustrated in FIG. 10, the segments 1010 would be an annular ring and there may also be a circular empty area in the perforated plate 1020 above the GHR outlet nozzles.

As illustrated in FIG. 8, a perforated plate 830 may be disposed proximate the ends of the GHR tube 822 (e.g., above the outlet nozzles of the tubes). The GHR tubes may penetrate the perforated plate 830. The plate 830 may include apertures for the GHR tube penetrations and a second set of apertures, which may be smaller. The gas stream from the mixing zone may pass through the second set of apertures to the shell side of the GHR. The second set of apertures may cause a further pressure drop and/or ensure even flow over the cross-section of the POX/GHR mixing space. Above this perforated plate 830 and the particulate layer 860, the combined synthesis gas flow may be asymmetric as the gas flow enters the baffled heat exchange section.

Various implementations of the three-stage reactors and/or two-stage reactors may include one or more or none of the following features. A vessel cross-sectional area (e.g., diameter) between the POX and GHR stage may be similar or different. For example, the vessel may narrow between the POX stage and the GHR stage and/or through the GHR stage. As another example, the vessel may have an approximately consistent cross-sectional area across the length of the vessel. In some implementations, a shell side of the GHR stage may include a layer of packing material, such as an inert ceramic-shaped packing material, (e.g., in space 860 illustrated in FIG. 8). The packing may be disposed above the perforated plate and may trap carbon particles produced by the POX burner (e.g., carbon particles may be produced particularly during start-up of the system as it is being brought up to operating temperature). A feature of the system may be that when the system is operated at temperatures of above approximately nine hundred degrees Celsius, any carbon trapped on the packing layer will be gasified to CO and $H_2$ when reacted by reaction with steam and/or $CO_2$.

Another feature of the system may be that the POX burner may be a single unit or multiple units each with separate an oxygen, fuel feed, and/or steam inlets. The POX burner(s) may be disposed proximate the bottom head of the POX stage and fire vertically upwards. The burner(s) may be designed to promote back mixing of hot product synthesis gas into the high temperature primary oxygen/hydrocarbon reaction zone to ensure even reaction temperature range. The burner(s) may also be designed to minimize, inhibit, and/or eliminate free carbon or soot production by the burner.

Another feature of the system may include that recirculation may be caused by the burner design and may provide a discharge gas flow pattern which provides a stable vortex flow immediately above each burner. The stable vortex flow may provide a large recirculation gas flow pattern back into the reaction zone of the burner. In some implementations, there may be a minimum level of bulk recirculation flow in the main area of the POX stage. For example, greater than 90% of the POX synthesis gas may have a residence time of 4 seconds or more to allow time to maximize production of synthesis gas in the POX reactor.

Another feature of the system may include that the mixing of the GHR tubes outlet synthesis gas flow and the POX synthesis gas flow may be independent of the flow patterns in the POX burner system. Thus, the appropriate flow pattern for each mixing stage may be implemented. In some implementations, a primary mechanism for mixing the GHR outlet synthesis gas from each catalyst filled tube is through the use of a restriction nozzle proximate an end of each tube. The gas exiting the nozzle may have an average outlet velocity of at least approximately 20 meters/second and/or from approximately 30 to 80 meters/second. These high velocity gas streams may cause a majority of the surrounding gas to mix with the GHR synthesis gas product exiting the tubes.

Another feature of the system may include that the GHR reactor vessel stage may be arranged with GHR tubes in a baffled heat exchanger configuration using either a segmental baffle or a disc and doughnut arrangement of baffles.

Another feature of the system may include significant cost savings (e.g., decreasing piping requirements, decreased footprint, more efficient heat recovery and utilization, etc.). For example, in some implementations, piping is not required for the product gas streams (e.g., synthesis gas) to flow between multiple vessels. The piping required for separate vessels is commonly high temperature, internally insulated with large diameter high pressure external steel pipe which must be either water jacketed to keep the temperature constant or monitored for any possible local heating due to problems with the internal insulation. Reduction of the need for this type of expensive piping may decrease costs of set-up (e.g., due to easier installation, less piping required, etc.) and production of synthesis gas (e.g., since the expensive piping will not need to be monitored, repaired, or replaced). As another example, when utilizing a three separate vessels, a minimum vertical and a horizontal separation is required between the vessels (e.g., by government and/or industry standards, such as DOW Fire and Safety Standards) to accommodate the high temperature synthesis gas piping connections. This means that the three vessels are supported in an expensive steel framework with a significant cross-sectional area and height. A single vessel can be free-standing with adequate clearance for removal of the burners from the base of the vessel. No supporting steel structure may be necessary and/or significantly less supporting steel may be required when compared with systems that utilize separate vessels. In addition, the cost of a single unit is significantly less than three units. For example, there are two high-pressure vessel heads, rather than six on single units. In addition, cost savings and time savings may be realized since one vessel coding and approval is required when utilizing a single unit, as opposed to three units or two units.

Another feature of the system includes that a single unit can be built as a modular fully fabricated, transportable assembly which may also include other upstream and downstream components at a much larger through-put than a three-vessel configuration. Another feature includes decreased risk of refractory failure, since the refractory arrangement, location and quantity may be more favorable than a design with internally insulated interconnecting piping.

Another feature of the system may include that approximately the same or a fewer number of significant problems are associated with starting up and operating with a single vessel. In fact, fewer problems may be associated with a single vessel when compared to two or three separate units, since in practice the entire three-vessel synthesis gas train must be started up, shut down and operated as a single unit with no isolation valves between the three units. Another feature may be that sensors to monitor plant performance may be easily positioned within the single vessel envelope. Furthermore, maintenance and inspection may be facilitated in the single-vessel configuration, when compared with maintaining and inspecting multiple units.

Another feature may include the stable vortex mixing of the POX stage. For example, the systems described in U.S. Pat. No. 4,741,885 include a swirling arrangement of POX burners along a length of a vessel to induce a vortex flow with an upward central component which has a cross-section corresponding to the cross-section of the tube area in the GHR. The use of multiple burners arranged tangentially around the periphery of the POX section and inclined at an angle to the radial axis at each burner position and also inclined upwards cause an upward swirling motion to be induced in the cavity of the POX stage. However, dead zones, or areas with insignificant mixing, or flow velocities, will occur. The dead zones may cause an uneven reaction temperature profile in the POX stage and/or decreased yield of synthesis gas. In addition, the system described in U.S. Pat. No. 4,741,885 causes a pressure differential across the unit. This pressure differential is highly undesirable. A further disadvantage is that the vortex formation is in the whole body of the POX space and serves to induce synthesis gas product at lower temperature to be drawn down into the POX space, thus locally lowering the POX space temperature and preventing the maximum conversion of the POX burner gases to synthesis gas due to the variation in temperature and residence time caused by this arrangement.

Although streams have been described to include various components in the implementations, the streams may include one or more other components. For example, although the feed stream is described as including methane, the feed stream may include other components such as other hydrocarbons (e.g., ethane, propane, butane, pentane, etc.), other carbon-containing compounds (e.g., carbon dioxide, carbon monoxide, alcohols, etc.), organic compounds, sulfur containing compounds (e.g., organic sulfur compounds, hydrogen sulfide, etc.), nitrogen, argon, etc. The feed stream may be natural gas, gases associated with the production of crude oil, combustible off-gasses from other processes such as refinery operations, liquid hydrocarbons, etc. In some implementations, when the feed stream may be processed natural gas, for example, the sulfur compounds in natural gas may be removed or at least partially removed to prevent catalyst damage, particularly in the GHR. As another example, although the synthesis gas is described as including carbon monoxide and hydrogen, the synthesis gas may also include other components, such as inert gases (e.g., nitrogen or argon). As another example, an oxygen stream may include inert gases or nitrogen, in addition to oxygen.

Although streams are described as gas streams or including gases, other forms of matter may also exist in the streams. For example, the stream may include liquid. As an example, streams in the WHB stage may include water and steam.

Although various features are described in conjunction with a description of the two-stage reactor or three-stage reactor, various features may apply to either.

Although pipes are described in various implementations, other conduits may be utilized as appropriate. Although vessels are described in various implementations, other types of containers (e.g., various shapes and designs) may be utilized as appropriate. Although a specific implementation of the system is described above, various components may be added, deleted, and/or modified. In addition, the various temperatures and/or concentrations are described for exemplary purposes. Temperatures and/or concentrations may vary, as appropriate.

A number of implementations have been described. Nevertheless, it will be understood that various modifications may be made without departing from the spirit and scope of the implementations. Accordingly, other implementations are within the scope of this application.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a stream" includes a combination of two or more streams and reference to "a feed" includes different types of feeds.

What is claimed is:

1. A method for producing fuel gas mixture comprising;
exothermically reacting a first portion of a hydrocarbon feed stream with at least one of steam or an oxidant gas comprising molecular oxygen to produce an exothermically generated syn-gas product;
endothermically reforming a second portion of the hydrocarbon feed stream with steam over a catalyst in a heat exchange reformer to produce an endothermically-reformed syn-gas product, wherein at least a portion of heat used in generation of the endothermically-reformed syn-gas product is obtained by recovering heat from the exothermically-generated syn-gas product and the endothermically reformed syn-gas product;
cooling the combined syn-gas stream to produce steam in a heat recovery boiler;
reducing the pressure of the cooled syn-gas stream in a power producing expansion turbine to the pressure required for a substantially $CO_2$ free fuel gas feed stream to a power producing gas turbine;
catalytically reacting a combination of the endothermically-reformed syn-gas product and the exothermically-generated syn-gas product in one or more catalytic carbon monoxide shift reactors to generate a combined stream including additional $H_2$ and $CO_2$;
cooling the combined syn-gas stream to near ambient temperature in a multipassage multi stream plate-fin heat exchanger which heats water required for steam production for the syn-gas generation system and preheats fuel gas product and evaporates water for mixing with the fuel gas product;
removing $CO_2$ from the combined shifted syn-gas stream above a specified threshold to produce a fuel stream with a minimum content of $CO_2$;
generating oxygen in an air separation unit which is supplied with air produced from air compressors driven by a first gas turbine;
utilizing at least part of the nitrogen from the air separation unit to to be mixed with the $CO_2$ depleted syn-gas plus evaporated water to provide a fuel gas for a second power producing gas turbine; and
utilizing at least part of the heat in the first gas turbine exhaust to provide at least part of the heat required for preheating fuel plus oxygen plus steam feeds to the syn-gas generation system.

2. The method of claim 1, wherein the exothermically-generated syn-gas product is generated using a partial oxidation burner followed by a catalytic reforming section in a convectively heated steam plus hydrocarbon reformer.

3. The method of claim 1, wherein the feed stream includes methane.

4. The method of claim 1, wherein the $CO_2$ removed from the combined syn-gas stream includes at least 80% of a total carbon present in the total hydrocarbon feed to the syn-gas generation system and the first gas turbine.

5. The method of claim 1, wherein the $CO_2$ is removed using at least one of a conventional physical scrubbing process or a conventional chemical scrubbing process.

6. The method of claim 1 wherein the $CO_2$ is removed in a combined CO shift conversion and $CO_2$ adsorption cyclic reactor system operating at above 250° C.

7. The method of claim 1 wherein the ratio of steam to carbon atoms combined with $H_2$ in the hydrocarbon feed is greater than 5.

8. The method of claim 1 wherein the pressure of the combined syn-gas stream leaving the steam boiler is greater than 60 bar.

9. The method of claim 1 wherein the syn-gas expander exit pressure is below 45 bar.

10. The method of claim 1, wherein the power generated from the first gas turbine provides all of the power required for the total $CO_2$ depleted fuel gas mixed stream delivered to the second gas turbine for power production.

11. A method for producing power, comprising;
exothermically reacting a first portion of a hydrocarbon feed stream with at least one of steam or an oxidant gas comprising molecular oxygen to produce an exothermically generated syn-gas product;
endothermically reforming a second portion of the hydrocarbon feed stream with steam over a catalyst in a heat exchange reformer to produce an endothermically-reformed syn-gas product, wherein at least a portion of heat used in generation of the endothermically-reformed syn-gas product is obtained by recovering heat from the exothermically-generated syn-gas product;
reactoring that reacts a combination of the endothermically-reformed syn-gas product and the exothermically-generated syn-gas product to generate a combined stream including additional $H_2$ and $CO_2$;
removing $CO_2$ from the combined stream above a specified threshold to produce a fuel stream;
sequestering the removed $CO_2$;
combusting a first part of the fuel stream to generate power for an air separation unit;
combusting a second part of the fuel stream to generate additional power for downstream consumption; and
heating, using the combusted first part and the combusted second part of the fuel stream, the hydrocarbon feed stream and water feeds to provide pre-heat feeds to a syn-gas generation system.

12. The method of claim 11, wherein the exothermically-generated syn-gas product is generated using a partial oxidation burner followed by a catalytic reforming section in an autothermal reformer.

13. The method of claim 11, wherein the feed stream includes methane.

14. The method of claim 11, wherein the $CO_2$ removed from the combine stream includes at least 80% of a total feed carbon.

15. The method of claim 11, wherein the $CO_2$ is removed using at least one of a conventional physical scrubbing process or a conventional chemical scrubbing process.

16. The method of claim 11, further comprising:
mixing an inert gas and steam with the fuel stream; and
passing the mixed fuel stream to a gas generator associated with generating the power.

17. The method of claim 11, further comprising cooling the combination of the combination of the endothermically-reformed syn-gas product and the exothermically-generated syn-gas product prior to the catalytic reaction.

18. The method of claim 17, wherein the generated power powers a gas-to-liquid plant independent of an external power supply or fuel source.

19. The method of claim 11, wherein the endothermically-reformed syn-gas product and the exothermically-generated syn-gas product are at a pressure between at least 70 to 100 bars.

20. The method of claim 11, wherein the first part and the second part of the fuel stream is 20 to 45 bars.

21. A system for producing hydrogen, comprising;
a partial oxidation reactor (PDX) or an autothermal reforming reactor (ATR) that exothermically reacts a first portion of a hydrocarbon feed stream with at least one of steam or an oxidant gas comprising molecular oxygen to produce an exothermically generated syn-gas product;
a gas-heated catalytic reformer (GHR) that endothermically reforms a second portion of the hydrocarbon feed stream with steam over a catalyst in a heat exchange reformer to produce an endothermically-reformed syn-gas product, wherein at least a portion of heat used in generation of the endothermically-reformed syn-gas product is obtained by recovering heat from the exothermically-generated syn-gas product;
one or more shift conversion reactors that reacts a combination of the endothermically-reformed syn-gas product and the exothermically-generated syn-gas product to generate a combined stream including additional $H_2$ and $CO_2$;
a scrubber that removes $CO_2$ from the combined stream above a specified threshold to produce a fuel stream;
a storage volume that sequesters the removed $CO_2$;
a first gas turbine that combusts a first part of the fuel stream to generate power for an air separation unit;
a second gas turbine that combusts a second part of the fuel stream to generate additional power for downstream consumption; and
a multi-channel heat exchanger that heats, using the combusted first part and the combusted second part of the fuel stream, the hydrocarbon feed stream and water feeds to provide pre-heat feeds to a syn-gas generation system.

22. The system of claim 21, wherein the $CO_2$ removed from the combine stream includes at least 80% of a total feed carbon.

23. The system of claim 21, further comprising a heat exchanger that cools the combination of the combination of the endothermically-reformed syn-gas product and the exothermically-generated syn-gas product prior to the catalytic reaction.

24. The system of claim 21, wherein generated power powers a gas-to-liquid plant independent of an external power supply or fuel source.

25. The system of claim 21, wherein the endothermically-reformed syn-gas product and the exothermically-generated syn-gas product are at a pressure between at least 70 to 100 bars.

26. The system of claim 21, where the first part and the second part of the fuel stream is 20 to 45 bars.

* * * * *